United States Patent
Shafet et al.

(10) Patent No.: US 11,200,310 B2
(45) Date of Patent: Dec. 14, 2021

(54) SENTENCE BASED AUTOMATED TURING TEST FOR DETECTING SCRIPTED COMPUTING ATTACKS

(71) Applicant: PAYPAL, INC., San Jose, CA (US)

(72) Inventors: Yuri Shafet, Beer Sheva (IL); Bradley Wardman, Phoenix, AZ (US); Nahman Khayet, Beer Sheva (IL)

(73) Assignee: PAYPAL, INC., San Jose, CA (US)

( * ) Notice: Subject to any disclaimer, the term of this patent is extended or adjusted under 35 U.S.C. 154(b) by 428 days.

(21) Appl. No.: 16/219,838

(22) Filed: Dec. 13, 2018

(65) Prior Publication Data

US 2020/0193009 A1 Jun. 18, 2020

(51) Int. Cl.
*G06F 21/36* (2013.01)
*G06N 3/04* (2006.01)
*G06F 16/33* (2019.01)
*G06F 16/332* (2019.01)

(52) U.S. Cl.
CPC ............ *G06F 21/36* (2013.01); *G06F 16/332* (2019.01); *G06F 16/3347* (2019.01); *G06N 3/04* (2013.01)

(58) Field of Classification Search
CPC ....................................................... G06F 21/36
See application file for complete search history.

(56) References Cited

U.S. PATENT DOCUMENTS

| | | | |
|---|---|---|---|
| 8,433,916 B2 * | 4/2013 | Kohavi | H04L 9/3271 713/182 |
| 8,978,121 B2 * | 3/2015 | Shuster | G06F 21/316 726/7 |
| 9,258,306 B2 * | 2/2016 | Saxena | H04L 63/10 |
| 9,584,524 B2 * | 2/2017 | Du | H04L 47/60 |
| 10,438,225 B1 * | 10/2019 | Reading | G06Q 30/0225 |
| 2007/0043681 A1 * | 2/2007 | Morgan | G06F 21/36 705/67 |
| 2010/0049526 A1 * | 2/2010 | Lewis | G10L 17/00 704/273 |
| 2010/0077209 A1 * | 3/2010 | Broder | G06F 21/46 713/168 |
| 2010/0082998 A1 * | 4/2010 | Kohavi | G06F 21/36 713/182 |
| 2014/0114984 A1 * | 4/2014 | Kadyrov | G06F 16/5854 707/748 |
| 2016/0283708 A1 * | 9/2016 | Getchius | G06F 21/36 |
| 2017/0068986 A1 * | 3/2017 | Chan | H04L 67/16 |

* cited by examiner

*Primary Examiner* — Simon P Kanaan
(74) *Attorney, Agent, or Firm* — Haynes and Boone, LLP

(57) ABSTRACT

There are provided systems and methods for a sentence based automated Turing test for detecting scripted computing attacks. A computing may request access to a service or data from a service provider, where the service provider may be required to determine that the device is used by a user and not a bot executing a scripted or automated process/attack against the service provider. To authenticate that the device is used by a user, the service provider may determine and output a challenge that queries the user to fill in one or more missing words from a sentence. Acceptable answers may be based on past messages and internal data that is specific to the service provider, as well as an external corpus of documents. The service provider may also further authenticate the user based on the user's response and a likely user response for that user.

20 Claims, 5 Drawing Sheets

US 11,200,310 B2

SENTENCE BASED AUTOMATED TURING TEST FOR DETECTING SCRIPTED COMPUTING ATTACKS

TECHNICAL FIELD

The present application generally relates to automated Turing tests to detect automated and script-based attacks by computing bots, and more specifically to generating authentication queries for bot detection using a corpus of documents and user messages and scoring user responses based on common textual strings.

BACKGROUND

Bad actors may utilize computing devices in an automated fashion to perform brute force attacks, overwhelm online service provider resources, and/or access unauthorized resources or accounts. For example, a malicious user may perform credential stuffing in order to determine valid account credentials (e.g. username and password) that the malicious user may then misappropriate and use fraudulently. In order to determine whether a computing device is acting in an automated fashion, various tests may be performed in order to tell apart whether a session is driven by humans or computers. For example, Completely Automated Public Turing test to tell Computers and Humans Apart (CAPTCHA) tests may request that the computing device repeat letters shown to the user or for the user to select images. However, bad actors have utilized advancements in technology and computing capabilities to defeat such tests. Thus, service providers require more robust bot detection and human verification capabilities in order to protect from fraudulent or malicious computing attacks and processes.

Figure 1:
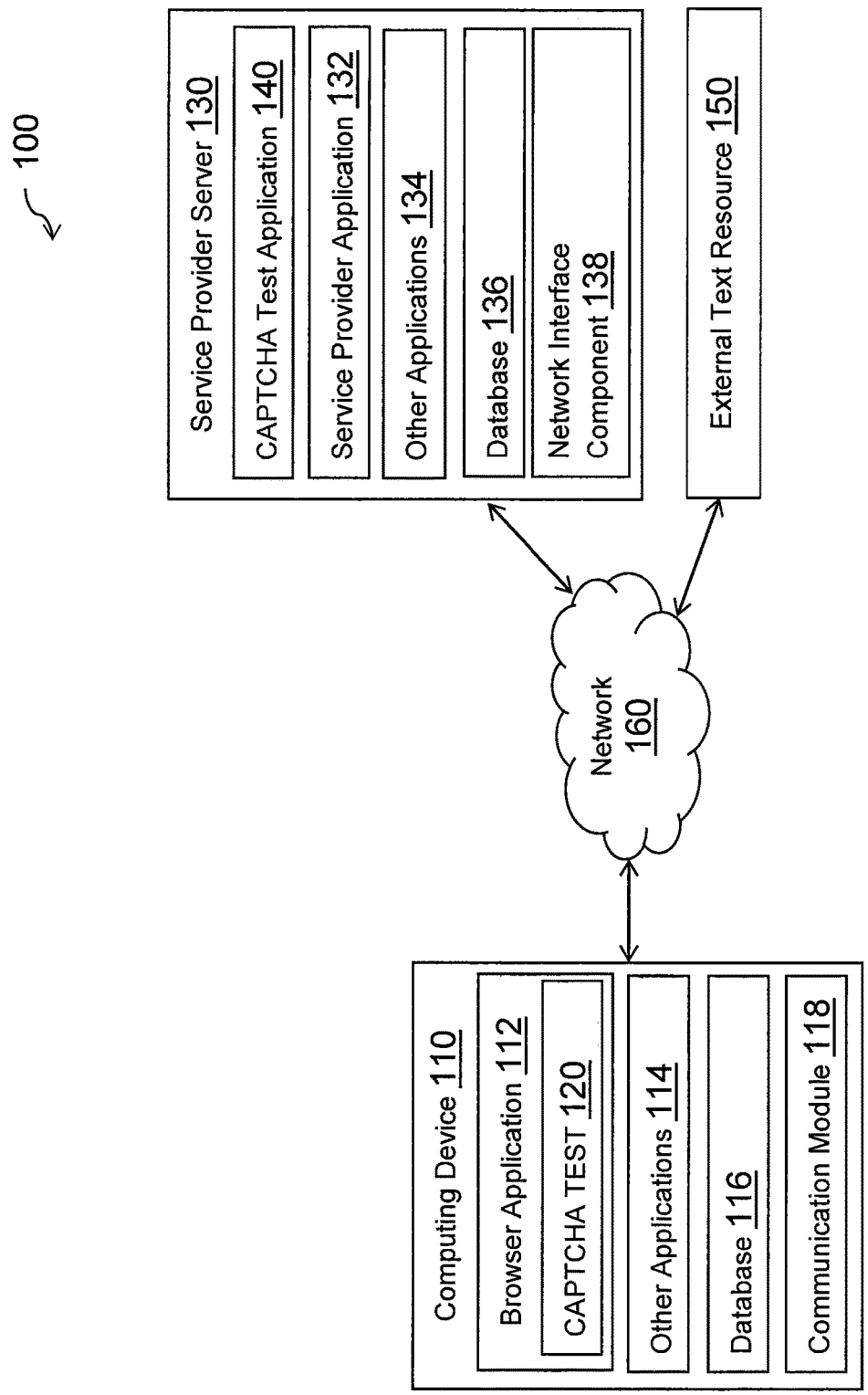
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for a sentence based automated Turing test for detecting and deterring scripted computing attacks. Systems suitable for practicing methods of the present disclosure are also provided.

An online service provider may provide data and services to users of the online service provider. Access to the service provider may be gated by authentication mechanisms and other tests to determine that a device requesting access to the service provider is utilized by a human user and not a computing bot or automated computing process. This prevents malicious or fraudulent users from abusing service provider resources and services, as well as limiting these bad actors from accessing unauthorized accounts or user data. The service provider may provide authentication services to determine whether a user is who they say they are. For example, account providers (e.g., payment service providers, financial institutions, online social networks, media sharing services, and other types of services where a user may be required to authenticate and/or may utilize an account with the service provider) may provide accounts to users that require authentication credentials (e.g., username and password) to access the account and perform account processes. An online payment provider or other transaction processing entity may provide payment processing, monetary transfer, and other financial services to merchants, consumers, and other users, which may be utilized through one or more applications executing on a user's device (e.g., browser or dedicated application) and an account of the user with the payment provider. In other embodiments, the user may not have an account with the payment provider, but may be required to be authenticated for their identity.

Generally, a user may specify authentication credentials, such as a login name, password, and/or personal identification number (PIN) for authentication of the user (e.g., access to an account). The authentication credentials may allow the user to verify their identity. However, authentication credentials may be stolen, and entry of authentication credentials is easily performed by automated computing tasks, such as crimeware that performs credential stuffing by entering lists of authentication credentials stolen through malware, keyloggers, viruses, hacked databases, etc. Bad actors may also wish to overload server resources of a service provider by repeatedly spamming the service provider with tasks, such as search tasks or account access tasks. Thus, authentication credentials may not protect users and service providers from bad actors that use automated bots to attack or otherwise fraudulently use service provider processes, data, and/or resources.

In order to provide increased security for service provider resources and/or authentication attempts (e.g., to authenticate the user for use of an account, such as a login attempt, or to validate the identity of the user), the service provider may generate automated Turing tests that assist in determining the differences between humans and computers (e.g., bots or automated scripts miming by computing devices) to help decide whether a computing device is being used by a real person. In this regard, the service provider may generate these human authentication queries, tests, or challenges based on text data, strings, and sentences available to the service provider. The input text data for generation of the queries may correspond to a corpus of documents available to the system, such as an online resource. For example, an online encyclopedia may provide online documents that may be parsed for text strings, sentences, paragraphs, and the like, which may be used as the input text data for query generation. Other online resources, such as messaging boards, help resources, news websites, etc. may also provide sample input text. The text data may also come from a media viewing website (e.g., NETFLIX®), such as content from a television show.

The text data may also include internal data from the service provider, such as data stored by the service provider from the services provided by the service provider. Some exemplary textual data for service provided by the service provider may include transaction data (e.g., from a financial institution, payment provider, user or merchant) from transactions and transfers processed by the service provider, as well as messages or comments associated with the transactions/transfers. The service provider may also provide a messaging platform, such as an email service, instant messaging service, social networking service, etc., to send and/or receive one or more messages, posts, or other content. The messaging platform may be used to exchange messages by users, which may be used as the textual data input, such as the strings and sentences in the messages. In other embodiments, the textual messages may be performed during other online actions, including electronic payments, purchases, transfers, and other transactions, website posts, media viewed and/or shared, games played, documents viewed and/or generated, work performed, or other types of online actions performed by the user that involve messaging and conversing.

In order to generate one or more queries, the text data may be parsed and one or more text strings (e.g., a partial or full sentence, or longer such as multiple sentences or a paragraph) may be selected as the test query. The service provider's system may then remove one or more words in order to test a device to determine if the device may replace the words with the same or similar (e.g., compatible) word (s) in the text string in order to verify that the device is being operated by a human. To select the word(s) for removal and determine one or more acceptable answers or responses for entry to the text string to satisfy the query, the system may first perform a language modeling and feature learning process to understand the semantic and syntax of the sentence, for example, by generating word embeddings in vector space of the words of the sentence, thereby understanding the relationship of the words within the text string to the other words. For example, using a process such as Word2vec, word vectors for words in a sentence may be generated, and a machine learning process may be trained that identifies sample words in a sentence for removal and allowable word responses or answers for entry by a user in the removed or missing word's place. In other embodiments, a Markov Model or recurrent neural network (RNN) may be trained using the word embeddings for the sentence in order to understand the relationship between the words within the sentence.

In this regard, the system may identify the words for removal based on words within a sentence that have a plurality of acceptable answers. For example, in the sentence "The dinner with my friends was great last night," it would not make sense to remove "The," as removal of the word allows one or a very limited number of acceptable answers. However, removal of "friends" or "great," allows for many different answers, each having their own rate or probability for entry based on the corpus of documents, messages, or other data used as text data input. Thus, the system may identify one or more key words within the text string to remove, and may generate a query of a text string, sentence, or longer that includes one or more missing key words. "Key" words may be identified by determining which word (s) in the sentence have the most plausible answers or substitutions and using the top one, two, three, or other predetermined number. In another example, key words may be identified by determining which word(s) have plausible answers or substitutions greater than a predetermined threshold, such as 5 or 10, and selecting all or some portion of those word(s). If none of the words meet the threshold, a new sentence may be generated or selected to determine existence of one or more key words. The system may also generate a list of acceptable responses or answers to fill in the missing word(s) within the text string. The list may include the removed word, as well as other words that satisfy the query. The list of acceptable responses may be based on similar word vectors as the removed word. For example, entry of "family" may be similar to "friends" based on the input text data (e.g., the internal/external corpus of documents and messages), or "good" or "awesome" may be similar to "great" in the aforementioned sentence. The system may also score or determine a probability of entering each of the alternative words, which may be based on an occurrence rate of the words in the input text data and/or a distance between the word vectors. The system may also implement a threshold requirement for the score or probability of entering the alternative words, which may serve to limit the acceptable word responses or may be used with additional data in determining which responses from the list are acceptable for a given authentication query, device, and authentication instance, as discussed herein.

The system may then receive an action from a computing device that requests access to or use of the service provider, such as access or use of data, services, processing capabilities, etc. The request may be a request for authentication, such as account access. However, the request may also occur when requesting use of a resource, such as searching on the service provider's website, processing a digital shopping cart, initiating a transfer, etc. The service provider's authentication system may output one or more authentication queries having one or more missing words in a text string and may request that the user provide those word(s). An interface provided by the service provider may display the text string missing the word(s) and may provide for a field for entry of the missing word(s) by the computing device. When displaying the text string missing the words, the service provider may generally output the text string as text data in an interface. However, in order to make the automated Turing test more robust, the service provider may also display an image having the text string missing one or more words so that the text string cannot be directly copied using an automated process and/or further obscure and adjust the image to make optical character recognition and other image processing automated processes more difficult.

The service provider may then receive the entry of words to fill the missing words in the sentence. In some embodiments, the user may also be primed using another device, so that the user is more likely to fill in one word over another. For example, the service provider may send a hint to a different device, such as a mobile phone, associated with the user that is not the same as the one, such as a PC, the user is making the request from. The hint may be through text, email, voice message, or other suitable communication means. In the earlier example, the user may receive a hint of "good acquaintances but not relatives" in the above sentence when "friends" is removed so that the user is more likely to add "friends" over "family. Thus, the content of the priming message may be utilized by the service provider to cause the user to make certain associations based on the content. In certain embodiments, the service provider may also adjust the list of acceptable responses based on the expected user's past data, location, and/or language of use. For example, certain words may be dialect-specific, more common in certain languages or regions, or more prevalent in the user's personal history of messages. Thus, the service provider may determine a location of a user (e.g., using a GPS component, IP address, etc. for the computing device), as well as a language used by the computing device and/or user history for the user. In one example, the sentence may refer to an event specific to the user, such as "I had a great time with Susan at Disneyland on June 12," with words being removed specific to the event, such as "Susan," "Disneyland," and "June 12." In other examples, the sentence may refer, more generally, to any knowledge the system may have about the user that only the user or a limited number of other users would know about, such as purchase of a specific product or service and the details associated with the purchase.

When receiving entry of one or more words to fill the missing words in the text string, the system may then determine whether the device's entry is within or satisfies the list of acceptable answers. Further if a probability score or threshold is instituted by the system, the system may require that the device's entry is above the threshold probability/score required for the authentication query. For example, the system may allow "family" to be substituted in the above response, but not "associates" as "associates" only appears infrequently or rarely within the corpus of input text/messages. The acceptable responses over a threshold probability level or score may also be specific to a confidence level that a user is using the computing device and/or that a specific user is utilizing the computing device. For example, if the computing device has previously completed a CAPTCHA test or been authenticated, the threshold level may be lower so that additional answers are acceptable. However, if the computing device is acting fraudulently, such as if a device is attempting to log into a predefined large number of accounts and/or appears to be acting in an automated fashion, the threshold level may be heightened to better check for fraud.

If the device's entry of words is acceptable, the device may then be authenticated as being used by a person, and the device may be allowed to access or use the service provider's processes, data, or services. However, where the user incorrectly answers or responds to the question, the service provider may not authenticate the user. In some embodiments, the service provider may generate another query for the user where the user fails to correctly answer the authentication query. In some embodiments, the next query may instead be based on the user's incorrect response to the previous query, as well as incorrect responses to other previous queries. In this way, the service provider may learn from the user's responses that are correct and incorrect to determine a best query sentence and missing words for the user when generating an authentication query. The next query may require the user to fill in one or more additional words to another sentence or may revise the present sentence to change the missing words. Additionally, the system may score all or just specific query responses by the device and determine whether the scores/probabilities together or individually exceed a threshold requirement.

In various embodiments, the user may instead request a new query, for example, if the authentication query includes a text string that is hard to understand or that include too many potential entries for the missing words. Similar to above where the user answers incorrectly, a new query may be generated, which may depend on the user's success rate and/or preference for certain types of queries, sentences, and/or words. The service provider may further utilize the data of the queries that the user, and other users/devices, answers incorrectly, correctly, or passes to determine updates to the machine learning system, revise present queries, and generate new queries. Thus, if users consistently answer certain queries correctly, such queries may be used by the system in the future, assuming that those users were correctly authenticated as human. However, if certain queries result in a wide range of answers or have a failure rate over a certain amount or threshold, the queries may be removed from the pool of available authentication queries, assuming those queries failed to correctly identify users as human.

Thus, human authentication queries may be made more robust through the use of available text string input, word embeddings, and machine learning to better detect automated computing bots and script based attacks on an online system. In this regard, problems with present automated Turing tests may be addressed to prevent bad actors from misappropriating data or wasting computing resources. Moreover, the system may utilize similar word vectors in vector space to allow for a range of inputs that allows differences in user speech patterns and word usage to be understood and utilized during authentication. Thus, online service provider platforms may provide better data security and resource allocation than previously provided using past human detection processes.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include devices, stand-alone, and enterprise-class servers, operating an OS such as a MICROSOFT® OS, a UNIX® OS, a LINUX® OS, or other suitable device and/or server based OSs. It can be appreciated that the devices and/or servers illustrated in FIG. 1 may be deployed in other ways and that the operations performed and/or the services provided by such devices and/or servers may be combined or separated for a given embodiment and may be performed by a greater or fewer number of devices and/or servers. One or more devices and/or servers may be operated and/or maintained by the same or different entities.

System 100 includes a computing device 110, a service provider server 130, an external text resource 150, in communication over a network 160. A user (not shown) may utilize computing device 110 to access services or data from service provider server 130, which may correspond to a valid user or a bad actor using computing device 110 as an automated bot to perform unauthorized actions with service provider server 130. Service provider server 130 may generate an authentication query to determine if the user is a real human user when using computing device 110. Service provider server 130 may utilize a corpus of text strings to generate the query, which may be missing one or more words within a text string that is within the corpus or generated using the corpus. Computing device 110 may provide a response to service provider server 130, which may determine whether computing device 110 is operated by a human using the response.

Computing device 110, service provider server 130, and external text resource 150 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160.

Computing device 110 may be implemented as a communication device that may utilize appropriate hardware and software configured for wired and/or wireless communication with service provider server 130. For example, in one embodiment, computing device 110 may be implemented as a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data, such as an IPAD® from APPLE®. Although a device is shown, the device may be managed or controlled by any suitable processing device. Although only one device is shown, a plurality of devices may function similarly.

Computing device 110 of FIG. 1 contains a browser application 112, other applications 114, a database 116, and a communication module 118. Browser application 112 and other applications 114 may correspond to executable processes, procedures, and/or applications with associated hardware. In other embodiments, computing device 110 may include additional or different modules having specialized hardware and/or software as required.

Browser application 112 may correspond to one or more processes to execute modules and associated devices of computing device 110 to request a service or data from service provider server 130 and display a received automated Turing test to determine whether computing device 110 is operated by a human or automated process. In this regard, browser application 112 may correspond to specialized hardware and/or software utilized by computing device 110 to first access and/or communicate with service provider server 130. Browser application 112 may correspond to an application utilized to access a website or other portal of service provider server 130, and retrieve and load an authentication interface (e.g., a login screen, interface, or webpage for the website). Thus, in various embodiments, browser application 112 may correspond to a general browser application configured to retrieve, present, and communicate information over the Internet (e.g., utilize resources on the World Wide Web) or a private network. For example, browser application 112 may provide a web browser, which may send and receive information over network 160, including retrieving website information, presenting the website information to the user, and/or communicating information to the website, including authentication interfaces and related data, as well as data and interfaces before and after authentication (e.g., navigation to a login screen, an account screen after login, etc.). In other embodiments, browser application 112 may include a dedicated application of service provider server 130 or other entity (e.g., a merchant, payment provider, etc.), which may be configured to provide service through the application, including authentication of a user identity.

Thus, browser application 112 may be associated with a service that requires authentication through an authentication query provided by service provider server 130. This authentication query may be CAPTCHA test 120. In this regard, browser application 112 may present an interface to a user of computing device 110, where the interface allows computing device 110 to respond to CAPTCHA test 120. The user may then respond to the query using browser application 112. CAPTCHA test 120 may provide a sentence missing one or more words, where browser application 112 may be utilized to enter text in order to fill in the missing words. Browser application 112 may transmit the entries to service provider server 130 for authentication.

In various embodiments, computing device 110 includes other applications 114 as may be desired in particular embodiments to provide features to computing device 110. For example, other applications 114 may include security applications for implementing client-side security features, programmatic client applications for interfacing with appropriate application programming interfaces (APIs) over network 160, or other types of applications. Other applications 114 may also include additional communication applications, such as email, texting, voice, and IM applications that allow a user to send and receive emails, calls, texts, and other notifications through network 160. In various embodiments, other applications 114 may include financial applications, such as banking, online payments, money transfer, or other applications 114. Other applications 114 may also include other location detection applications, such as a mapping, compass, and/or GPS application, which may be used to determine a location for the user that is communicated to payment provider server 130. Other applications 114 may include device interfaces and other display modules that may receive input and/or output information. For example, other applications 114 may contain software programs, executable by a processor, including a graphical user interface (GUI) configured to provide an interface to the user.

Computing device 110 may further include database 116 stored in a transitory and/or non-transitory memory of computing device 110, which may store various applications and data and be utilized during execution of various modules of computing device 110. Thus, database 116 may include, for example, identifiers (IDs) such as operating system registry entries, cookies associated with user history application 112 and/or other applications 114, IDs associated with hardware of computing device 110, or other appropriate IDs, such as IDs used for payment/user/device authentication or identification. Database 116 may include CAPTCHA test 120 for output and response using browser application 112.

Computing device 110 includes at least one communication module 118 adapted to communicate with service provider server 130. In various embodiments, communication module 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Service provider server 130 may be maintained, for example, by an online service provider, which may provide authentication services for the user associated with computing device 110. In this regard, service provider server 130 includes one or more processing applications which may be configured to interact with computing device 110, external text resource 150, and/or another device/server to facilitate authenticating a user through an authentication query generated by service provider server 130. In one example, service provider server 130 may be provided by PAYPAL®, Inc. of San Jose, Calif., USA. However, in other embodiments, service provider server 130 may be maintained by or include a financial service provider, social networking service, email or messaging service, media sharing service, and/or other service provider, which may provide authentication services, for example, for the use of a provider account.

Service provider server 130 of FIG. 1 includes a CAPTCHA test application 140, a service provider application 132, other applications 134, a database 136, and a network interface component 138. CAPTCHA test application 140, service provider application 132, and other applications 134 may correspond to executable processes, procedures, and/or applications with associated hardware. In other embodiments, service provider server 130 may include additional or different modules having specialized hardware and/or software as required.

CAPTCHA test application 140 may correspond to one or more processes to execute modules and associated specialized hardware of service provider server 130 to generate an authentication query based on a corpus of text, such as internal data generated using service provider application 132 and/or external data provided by external text resource 150. In this regard, CAPTCHA test application 140 may correspond to specialized hardware and/or software to receive a request to access a service, process or data associated with service provider server 130 from computing device 110 and respond with CAPTCHA test 120 to determine whether computing device 110 is operated by a human. Prior to transmission of CAPTCHA test 120 to computing device 110, CAPTCHA test application 140 may generate CAPTCHA test 120 using a corpus of text documents. CAPTCHA test application 140 may generate CAPTCHA test 120 by converting words and text strings in the input text data into word embeddings in order to determine structural information for the word strings in the text input and similarities between words in the text strings. Using the word embeddings, one or more words from a text string may be removed, and CAPTCHA test 120 may be generated having the text string with the missing word(s). CAPTCHA test application 140 may utilize the word embeddings to generate a list of acceptable answers based on similarities in vector space between the words in the sentences, and may determine a probability or likelihood of entry of each of the words in the acceptable answers. Thus, CAPTCHA test application 140 may generate and store CAPTCHA test 120 having the authentication query of a text string missing one or more words and a list of acceptable answers, which may be transmitted to computing device 110.

Service provider application 132 may correspond to one or more processes to execute modules and associated specialized hardware of service provider server 130 to receive and/or transmit information from computing device 110 for establishing an account or utilizing another service of service provider server 130. In this regard, service provider application 132 may correspond to specialized hardware and/or software to establish an account, for example, a payment account, which may be utilized to send and receive payments and monetary transfers and engage in other financial transactions. Other types of accounts may correspond to messaging, social networking, media sharing, microblogging, and other types of accounts associated with a provided service. A user may establish an account with service provider application 132 by providing personal and/or financial information to service provider server 130 and selecting an account login, password, and other authentication information. The account may be accessed and/or used through a browser application and/or dedicated payment application executed by computing device 110. In order to authenticate that a human is attempting to access the account or another service provided by service provider server 130, CAPTCHA test application 140 may be utilized with service provider application 132 to provide CAPTCHA test 120 to computing device 110. Once authenticated, service provider application 132 may be utilized to use various services provided by service provider server 130, such as payment, social networking, messaging, or other available services. Service provider application 132 may also be used by one or more users to exchange messages, which may be used and input text data for generation of authentication queries. In this regard, the messages may be in one or more languages, and may also be regionally specific based on locations of transmission and/or receipt of the messages.

In various embodiments, service provider server 130 includes other applications 134 as may be desired in particular embodiments to provide features to payment provider server 134. For example, other applications 134 may include security applications for implementing server-side security features, programmatic client applications for interfacing with appropriate application programming interfaces (APIs) over network 160, or other types of applications. Other applications 134 may contain software programs, executable by a processor, including a graphical user interface (GUI), configured to provide an interface to the user when accessing payment provider server 134. In various embodiments, where not provided by service provider application 132, other applications 134 may include connection and/or communication applications, as well as user account applications, which may be utilized by the user associated with computing device 110.

Additionally, service provider server 130 includes database 136. Accounts in database 136 may include entity information, such as name, address, birthdate, payment/funding information, additional user financial information, and/or other desired user data. The entity may link to their respective accounts through an account, user, merchant, and/or device identifier, as well as a generated token, which may be provided to computing device 110 for use. Thus, when an identifier is transmitted to service provider server 130 (e.g., from computing device 110) an account belonging to the entity may be found. CAPTCHA test 120 and additional authentication queries may be stored in database 136, as well as text data for the authentication queries and processed data (e.g., word embeddings) from the text data.

In various embodiments, service provider server 130 includes at least one network interface component 138 adapted to communicate with computing device 110 and/or external text resource 150 over network 160. In various embodiments, network interface component 138 may comprise a DSL (or Digital Subscriber Line) modem, a PSTN (or Public Switched Telephone Network) modem, an Ethernet device, a broadband device, a satellite device and/or various other types of wired and/or wireless network communication devices including microwave, radio frequency (RF), and infrared (IR) communication devices.

External text resource 150 may be implemented as a storage source that may store text data and other information for use in determining one or more authentication queries. In various embodiments, external text resource 150 may include one or more hardware and/or software components to access and provide the text data. In some embodiments, external text resource 150 may correspond to a server and/or online database, as well as cloud computing architectures, or a local storage device. Although only one source is shown, a plurality of sources may function similarly.

External text resource 150 may include textual information, such as a corpus of documents having text strings and sentences. In some embodiments, external text resource 150 may correspond to an online encyclopedia that includes articles and information generated by one or more entities, including distributed users. Additionally, external text resource 150 may include text data from messaging, digital transactions, website/device/server interactions, gaming experiences, media shared/viewed, connections made and/or utilized, and other types of virtual/online events. Service provider server 130 may retrieve data from external text resource 150 for use in determining one or more authentication queries. External text resource 150 may also provide the text data in one or more languages, and may provide text data that is regionally or even user specific.

Network 160 may be implemented as a single network or a combination of multiple networks. For example, in various embodiments, network 160 may include the Internet or one or more intranets, landline networks, wireless networks, and/or other appropriate types of networks. Thus, network 160 may correspond to small scale communication networks, such as a private or local area network, or a larger scale network, such as a wide area network or the Internet, accessible by the various components of system 100.

Figure 2B:
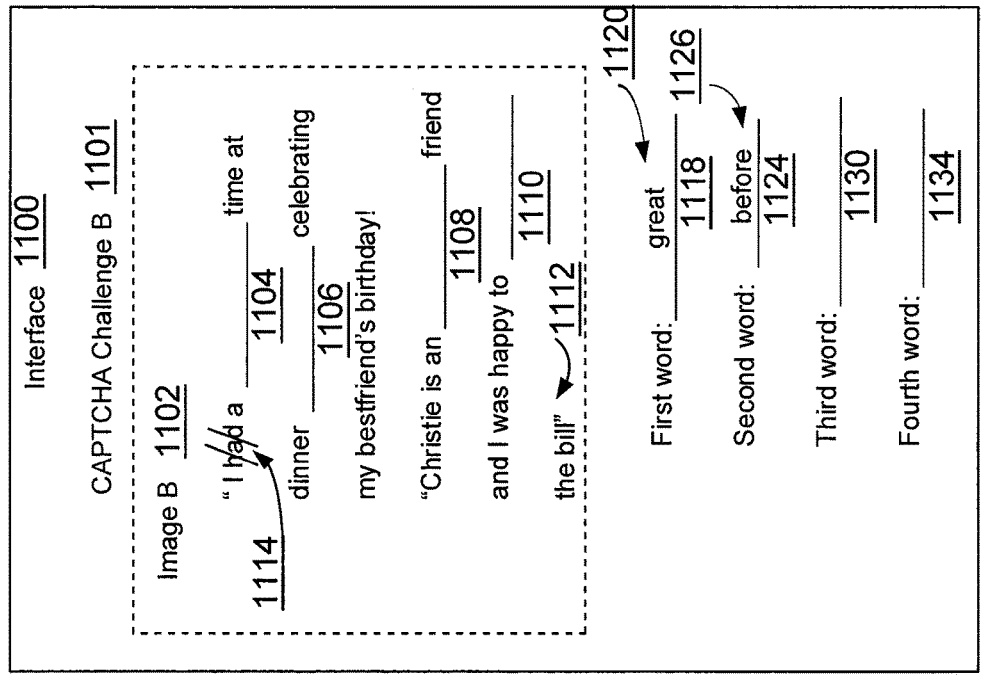
FIG. 2B is an exemplary application interface for a sentence based automated Turing test requesting additional user entry of missing words, according to an embodiment.
Figure 2A:
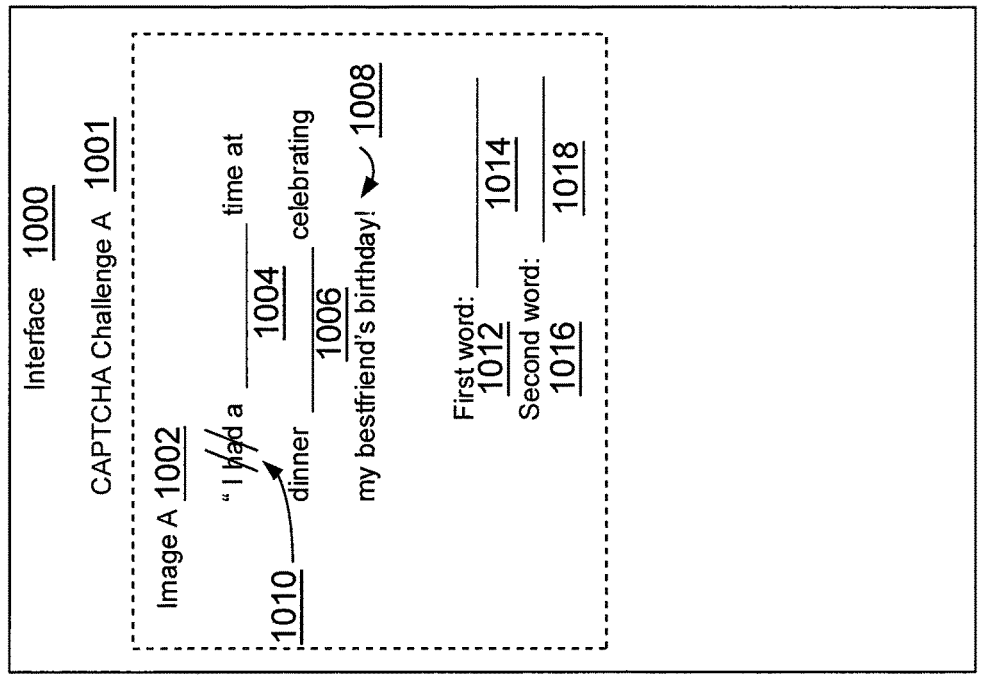
FIG. 2A is an exemplary application interface for a sentence based automated Turing test requesting initial user entry of missing words, according to an embodiment.

FIG. 2A is an exemplary application interface for a sentence based automated Turing test requesting initial user entry of missing words, according to an embodiment. Although sentences are shown, any other string of text, numbers, or other types of characters may also be utilized. As such, the string may include alphanumeric or special characters, symbols, icons or images representing words or strings of characters, and other types of strings. Interface 1000 in environment 200a may correspond to an interface of an application executed by a computing device 110, such as browser application 112 of computing device 110 in FIG. 1. In this regard, interface 1000 may include an interface, such as a graphical user interface of a device application, which may be used to respond to an authentication query.

In interface 1000 of environment 200a, a CAPTCHA challenge 1001 is presented on a device for the device to respond to in order to determine whether the device is operated by a human. CAPTCHA challenge 1001 includes an image A 1002, where image A 1002 may be generated to include a test query for authentication of the user using the device that may be generated to prevent image processing and/or OCR (or Optical Character Recognition) to recognize characters for automated reading of the test query. For example, blurred section 1010 may prevent recognition through OCR of a portion of sentence 1008 in image A 1002, including distortion, strike-throughs, misspellings, and semi-transparent overlays. However, a user may still be able to decipher the words in blurred section 1010 of sentence 1008 so that the user may complete the missing words in sentence 1008.

When reading sentence 1008 in image A 1002, one or more words may be missing. For example, missing section 1004 and missing section 1006 may be removed from an initial sentence to generate the test query in image A 1002. For example, sentence 1008 may initially read, "I had a great time at dinner yesterday celebrating my best friend's birthday!" However, missing section 1004 is shown as removing "great" and missing section 1006 is shown as removing "yesterday" in the aforementioned sentence. Thus, interface 1000 queries a user to fill in words matching or similar to "great" and "yesterday" in order to determine whether the user is a human, or whether an automated bot is attempting to pass the automated Turing test in environment 200a. CAPTCHA challenge A 1001 may then include a first word query 1012 having a first field 1014 to fill in a word for missing section 1004, and a second word query 1016 having a second field 1018 to fill in a word for missing section 1006. Based on entry of one or more words to first field 1014 and second field 1018, the device may be authenticated as being operated by a human or may be rejected as being potentially malicious and using an automated process to attempt to respond to CAPTCHA challenge A 1001. For example, FIG. 2B may show exemplary responses that are processed by a system to determine whether the response words satisfy the requirements of CAPTCHA challenge A 1001. For the first word, there may be a wider range of acceptable responses than for the second word. For example, synonyms such as "good," "awesome," "fantastic," and "amazing" may be acceptable for the first word, but only "yesterday" or "on June 3" (the date of the dinner) may be acceptable for the second word.

FIG. 2B is an exemplary application interface for a sentence based automated Turing test requesting additional user entry of missing words, according to an embodiment. Interface 1100 in environment 200b may correspond to an interface of an application executed by a computing device 110, such as browser application 112 of computing device 110 in FIG. 1. In this regard, interface 1100 may include an interface, such as a graphical user interface of a device application, which may be used to provide additional response input to an authentication query after initial presentation of the authentication query in environment 200a of FIG. 2A.

In interface 1100 of environment 200b, CAPTCHA challenge B 1101 is shown as a new challenge for human authentication after entry of an initial response to CAPTCHA challenge 1001 in environment 200a. For example, in environment 200b, a device may have provided initial responses to a portion of CAPTCHA challenge B 1101 in image B 1102. CAPTCHA challenge B 1101 is shown as revising CAPTCHA challenge A 1001 to include an additional sentence. For example, text string 1112 includes two sentences, where the initial sentence from CAPTCHA challenge A 1001 is expanded to include an additional sentence to further query whether a user is operating the device accessing interface 1100. This may be required when text input to answer CAPTCHA challenge A 1001 is unacceptable, does not meet a score/probability requirement, and/or indicates that the device accessing interface 1000 may be operated by a bot or script.

Thus, text string 1112 includes the sentence from FIG. 2A and an additional sentence, which may initially correspond to "I had a great time at dinner yesterday celebrating my best friend's birthday! Christie is an amazing friend and I was happy to pay the bill." As in FIG. 2A, missing section 1104 removes "great" for first word query 1116 and missing section 1106 removes "yesterday" from second word query 1122. First field 1118 for first word query 1116 is filled in with "great" as text entry 1120 while second field 1124 for second word query 1122 is filled in with "before" as text entry 1126. The system analyzing first text entry 1120 and second text entry 1126 may accept "great" for first text entry 1120 but reject "before" for second text entry 1126.

Thus, the system may further query the device to provide missing section 1108 and missing section 1110 for the second sentence in text string 1112. In the sentence, "Christie is an amazing friend and I was happy to pay the bill," missing section 1108 removes "amazing" and missing section 1110 removes "pay." Thus, third word query 1128 and fourth word query 1132 allows for entry of additional text input to authenticate that the device is being operated by a human in third field 1130 and fourth field 1134, respectively. The system may accept "amazing" and "pay" in third field 1130 and fourth field 1134, respectively, but may also accept similar words based on word embeddings of a corpus of text, such as "super" or "good" for third field 1130 or "split" or "cover" for fourth field 1134. This may further be based on probability of occurrence of the alternative words in the corpus of text, or the distance between similar word vectors. Similar to FIG. 2A, in environment 200b, image B 1102 is also shown as having a blurred portion 1114 in order to obscure a portion of CAPTCHA challenge B 1101 to prevent automated computing processes from reading text in image B 1102.

Figure 3:
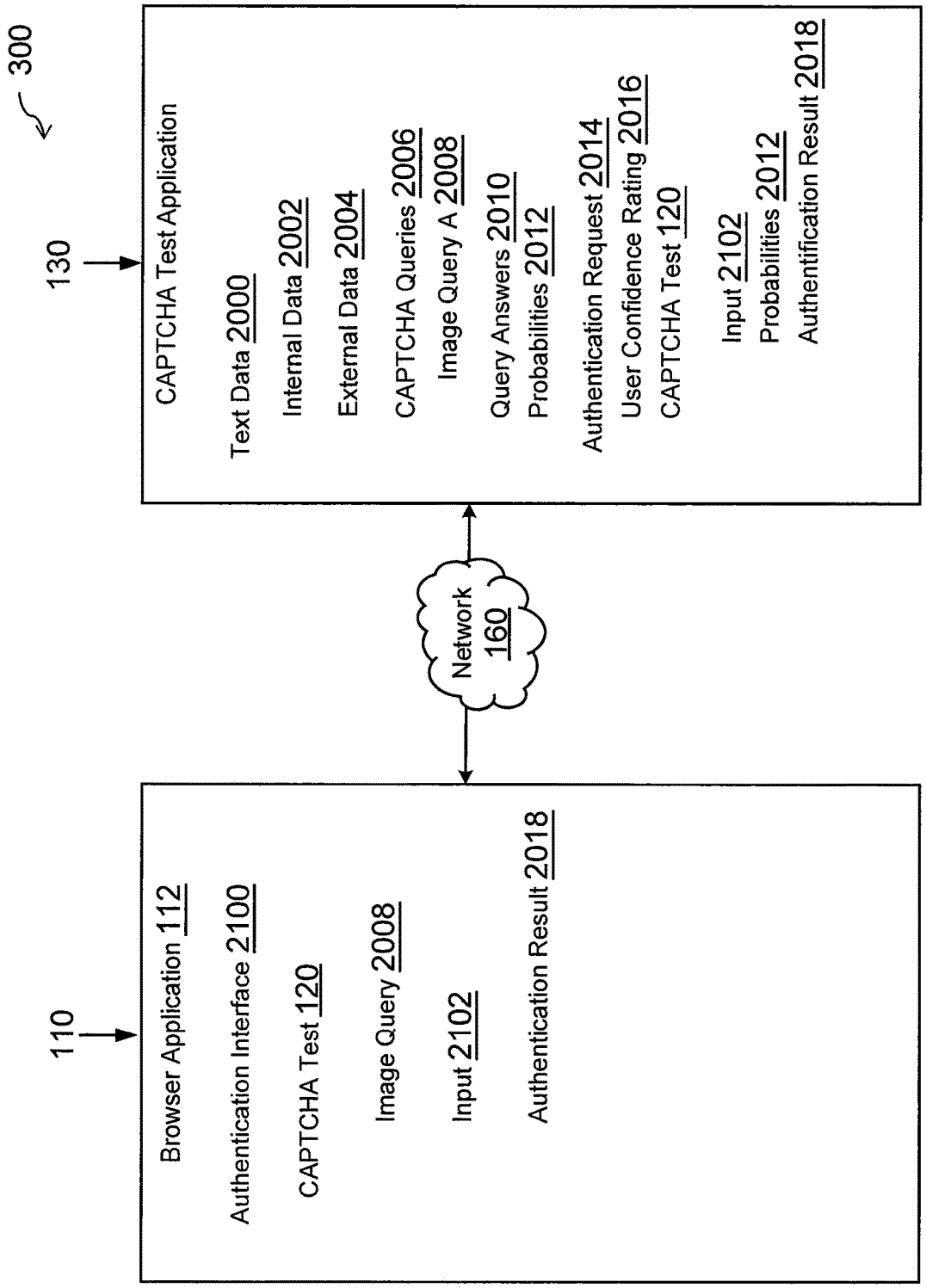
FIG. 3 is an exemplary system having a communication device and a service provider interacting to complete a sentence based automated Turing test for detecting scripted computing attacks, according to an embodiment.

FIG. 3 is an exemplary system 300 having a communication device and a service provider interacting to complete a sentence based automated Turing test for detecting scripted computing attacks, according to an embodiment. System 300 of FIG. 3 includes a computing device 110 and a service provider server 130 in communication over a network 160 corresponding generally to the described devices and associated features found in system 100 of FIG. 1.

Service provider server 130 executes a CAPTCHA test application 140 corresponding generally to the specialized hardware and/or software modules and processes described in reference to FIG. 1. In this regard, CAPTCHA test application 140 includes information that may be used to determine authentication queries, and output the authentication queries to determine whether a device is being operated by a human or is participating in a bot or script-based attack. For example, CAPTCHA test application 140 may access or receive test data 2000, which may correspond to internal data 2002 of a system corresponding to service provider server 130, such as messages sent using the system and documents generated or stored by the system, and external data 2004 taken from an online resource having a corpus of documents. For example, internal data 2002 may include messages sent to and from users when using a service provided by service provider server 130 (e.g., messages sent when transferring money or paying other users, emails, instant messages, etc.). Internal data 2002 may also include internal documents, data posted for user information or instructions, help platform data, and the like that may be used by administrators and/or users of the system. Using internal data 2002 and external data 2004, CAPTCHA queries 2006 having an image query A 2008 may be generated. CAPTCHA test application 140 may also determine query answers 2010 corresponding to the list of acceptable answers based on the same or similar words removed from CAPTCHA queries 2006. Additionally, based on the occurrence or similarities between the words, probabilities 2012 may also be determined for query answers 2010.

Computing device 110 executes a browser application 112 corresponding generally to the specialized hardware and/or software modules and processes described in reference to FIG. 1. In this regard, browser application 112 may be used to submit authentication request 2014 to service provider server, and in response, display authentication interface 2000 that includes CAPTCHA test 120 from CAPTCHA queries 2006. Authentication request 2014 may include a user confidence data 2016 to determine a degree of difficulty and acceptable answers for CAPTCHA test 120. Browser application 112 may be used to provide input 2102 to respond to image query A 2008 in CAPTCHA test 120. CAPTCHA test application 140 may process input 2102 with probabilities 2012 and user confidence rating 2016 to determine an authentication result 2018 of CAPTCHA test 120, and may authenticate or deny computing device 110 based on authentication result 2018.

Figure 4:
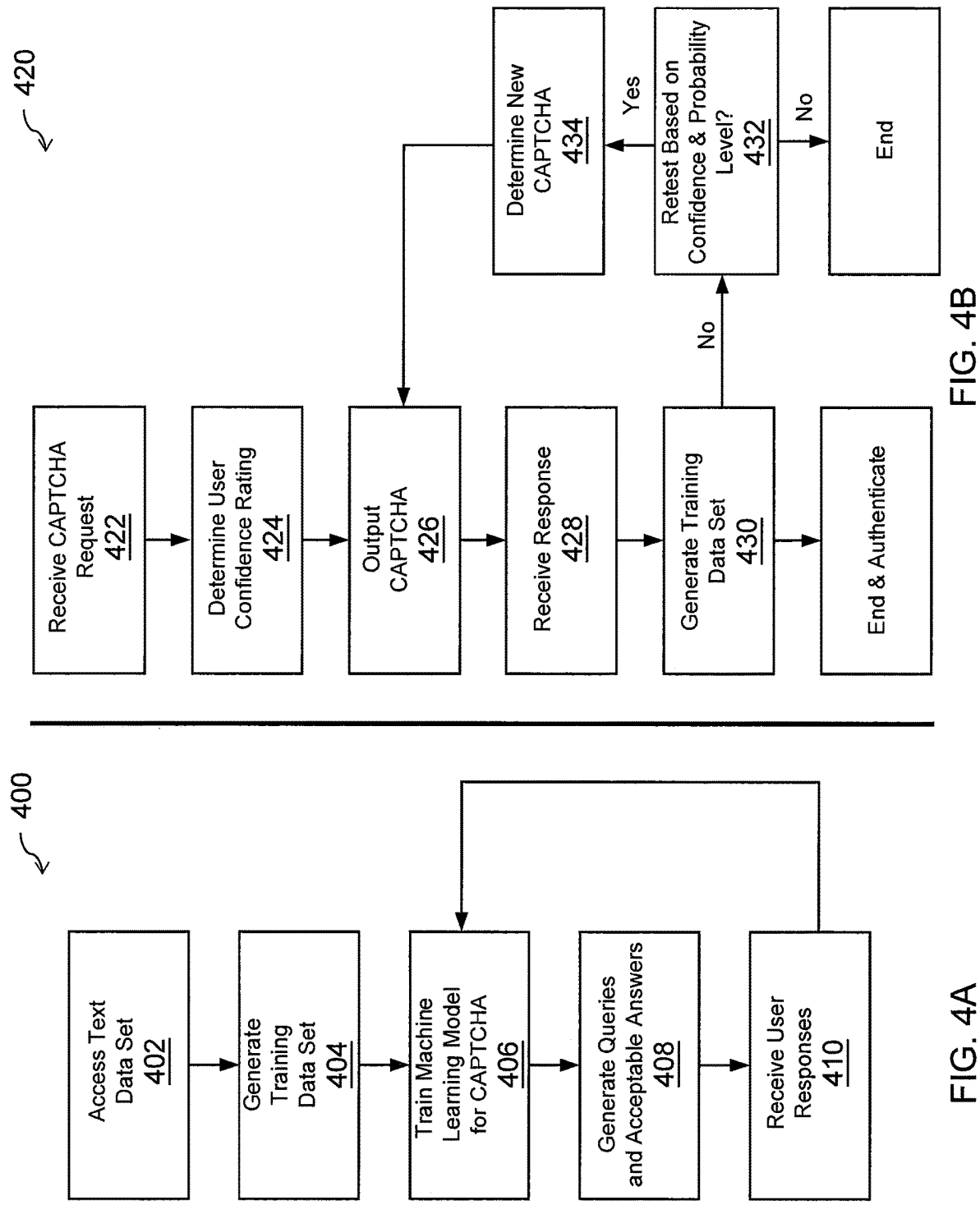
FIG. 4A is an exemplary flowchart for generation and updating of a sentence based automated Turing test for detecting scripted computing attacks, according to an embodiment.
FIG. 4B is an exemplary flowchart for testing a device using a sentence based automated Turing test for detecting scripted computing attacks, according to an embodiment.

FIG. 4A is an exemplary flowchart for generation and updating of a sentence based automated Turing test for detecting scripted computing attacks, according to an embodiment. Note that one or more steps, processes, and methods described herein of flowchart 400 may be omitted, performed in a different sequence, or combined as desired or appropriate.

At step 402 of flowchart 400, a text data set may be accessed, for example, from stored data by an automated Turing test system (e.g., other data stored or generated using the system) or an external resource that provides text documents and strings. This allows the system to generate a training data set at step 404 using the text data, for example, by generating word embeddings through a process such as Word2vec or other process to translate words, word context, and semantics in text strings into numerical word vectors that describe the word in vector space. Utilizing the word embeddings, a machine learning model, such as a RNN or Markov model, may be trained using the training data, at step 406. Once the machine learning model is generated that may be used to understand language and word similarities and text string structure using a corpus of documents, at step 408 queries may be generated, for example, by removing words from text strings in the corpus of documents or by using the machine learning model. Corresponding acceptable answers may further be generated. At step 410, user responses may be received, which may be fed back into the machine learning model to refine the model and further generate queries and acceptable answers.

FIG. 4B is an exemplary flowchart for testing a device using a sentence based automated Turing test for detecting scripted computing attacks, according to an embodiment. Note that one or more steps, processes, and methods described herein of flowchart 420 may be omitted, performed in a different sequence, or combined as desired or appropriate.

At step 422 of flowchart 420, a CAPTCHA request is received by a system that provides automated Turing tests to determine whether a device is being operated by a human. The CAPTCHA request may be received when a device attempts to access a service, data, or account provided by an online service provider, and may be used to test that the device is not performing some malicious or automated process to fraudulently access the service or data, and/or waste server resources. Additionally, at step 404, a user confidence rating may be determined so that the system may determine acceptable answers for a CAPTCHA test based on the user identity and whether that user is actually utilizing the device.

In order to test that the device is being operated by a human, a CAPTCHA-like test as described herein may be output, at step 426. The CAPTCHA-like test may be performed based on completion of sentences having missing words using the operations described herein. Thus, the CAPTCHA may correspond to a test that has a sentence missing one or more words that are required to be filled in by the device/user, and where the entered words are required to meet a list of acceptable answers based on occurrence, probability, user specific knowledge, or score of those words for filling in the missing words. After transmission of the CAPTCHA to a device, a response may be received, at step 428, which may include entry of a word to fill in the missing gaps within the sentence. At step 430, the system may determine whether the entered words satisfy the probability level or score that is required for list of acceptable answers to the missing words in the sentence or text string. If so, the process may end and the device may be authenticated or verified as being operated by a human. However, if the entered words do not satisfy the acceptable answers, at step 432, the system may determine whether to retest the device based on the confidence and probability levels or ratings. This may be based on whether the words were close but did not meet a minimum level for validating the device, or may be issued automatically based on failing the CAPTCHA test. If the system does not retest the device, the process may end without authenticating the user. However, if the system does determine to retest the device, at step 434, the system may determine a new CAPTCHA. This may then return to step 426 where the CAPTCHA is output, and a response is processed to determine whether to authenticate.

Figure 5:
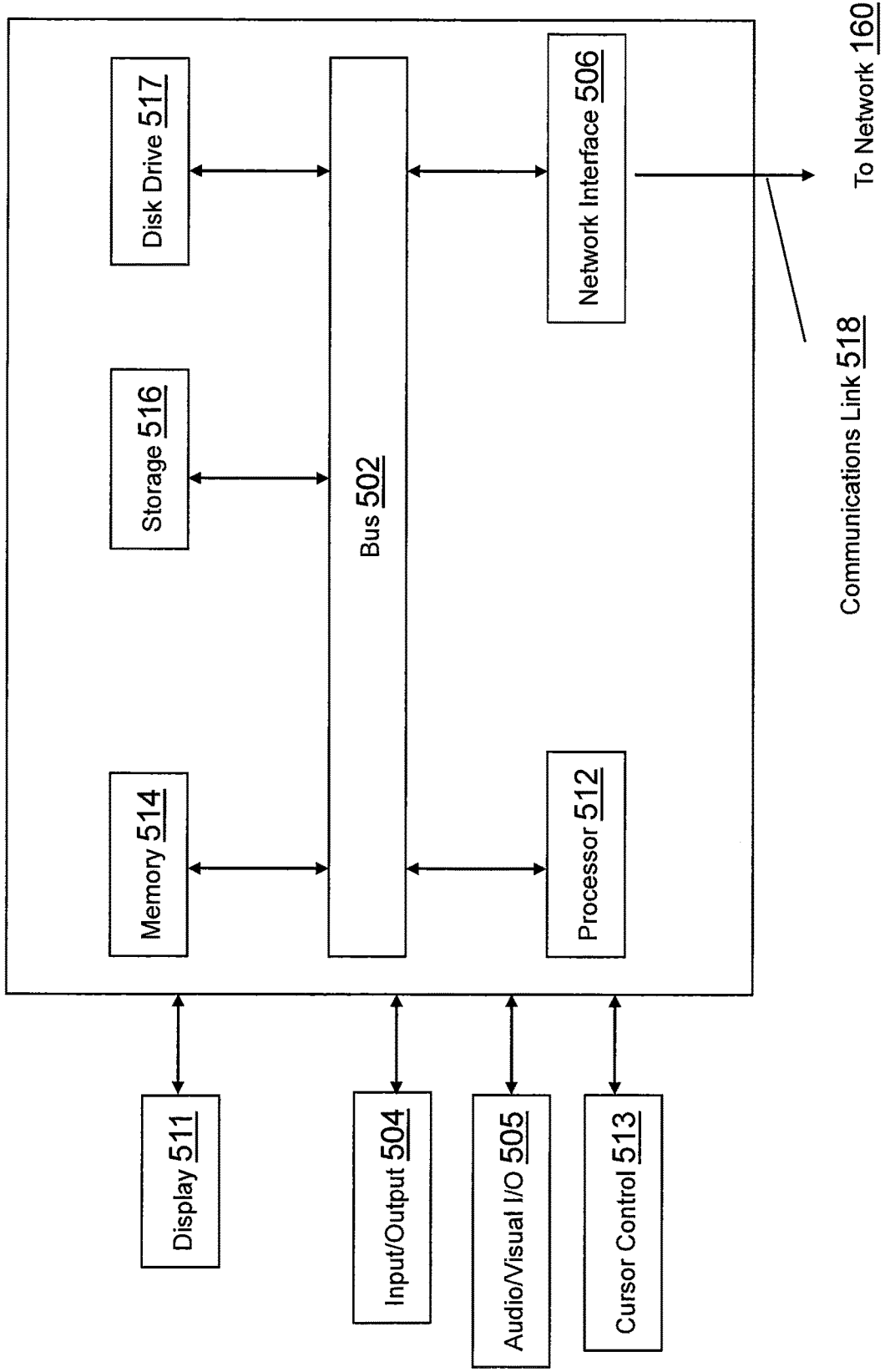
FIG. 5 is a block diagram of a computer system suitable for implementing one or more components in FIG. 1, according to an embodiment.

FIG. 5 is a block diagram of a computer system 500 suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 160. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
a non-transitory memory storing a plurality of queries, each of the plurality of queries comprising a sentence missing one or more words, and a list of acceptable responses for the missing one or more words; and
one or more hardware processors configured to execute instructions to cause the system to perform operations comprising:
detecting an authentication request from a computing device;
causing to be displayed on the computing device a first authentication query from the plurality of queries, wherein the first authentication query is based on previous user messages transmitted using a messaging service associated with the system;
receiving, in response to the first authentication query, a first entry of one or more words;
comparing the first entry to a first list of acceptable responses from the list of acceptable responses corresponding to the first authentication query, wherein the first list of acceptable responses was determined based on word vectors generated from the sentence and a training set of word vectors determined from at least one of the previous user messages or a digital corpus of text; and
authenticating the computing device based on determining the first entry matches one of the first list of acceptable responses.

2. The system of claim 1, wherein the authentication request is received from an authentication login screen provided by the system to the computing device through a website or a dedicated application associated with the system, and wherein the authentication request comprises a Completely Automated Public Turing test to tell Computers and Humans Apart (CAPTCHA) type test.

3. The system of claim 1, wherein each acceptable response of the first list of acceptable responses includes a corresponding probability level, and wherein the one of the first list of acceptable responses to which the first entry corresponds to a probability level below an acceptable probability level, the operations further comprising:
causing to be displayed on the computing device a second authentication query from the plurality of queries;
receiving, in response to the second authentication query, a second entry of one or more words;
comparing the second entry to a second list of acceptable responses from the list of acceptable responses corresponding to the second authentication query; and
authenticating the computing device based on determining the second entry matches one of the second list of acceptable responses, the one of the second list of acceptable responses corresponding to a probability level above the acceptable probability level.

4. The system of claim 1, wherein the operations further comprise:
updating the first list of acceptable responses based on a plurality of user responses to the first authentication query.

5. The system of claim 1, wherein the first list of acceptable responses is determined using the word vectors and one of a Markov modeling or a recurrent neural network.

6. The system of claim 1, wherein the first entry comprises a request for a new authentication query, and wherein the operations further comprise:
causing to be displayed on the computing device a second authentication query from the plurality of queries;
receiving a second entry of one or more words;
comparing the second entry to a second list of acceptable responses from the list of acceptable responses corresponding to the second authentication query; and
authenticating the computing device based on determining the second entry matches one of the second list of acceptable responses, the one of the second list of acceptable responses.

7. The system of claim 6, wherein the operations further comprise:
determining that the first authentication query results in a failure rate over a threshold failure rate based on the request for the new authentication query and at least an additional user entry to the first authentication query; and
removing the first authentication query from the plurality of queries.

8. The system of claim 1, wherein the operations further comprise:
determining a confidence level that a user utilizing the computing device is a trusted user of the computing device, wherein the first authentication query is selected based on the confidence level.

9. The system of claim 1, wherein the first authentication query comprises an image of a first sentence missing a first word, and wherein the image includes at least one obfuscated portion.

10. The system of claim 1, wherein the authentication request is for an account authentication for an account and comprises account credentials, and wherein the authenticating the computing device comprises authenticating the computing device for use of the account based on the account credentials, the first entry, and the first list of acceptable responses.

11. A method comprising:
receiving, by a computer system, an access request associated with a service provider from a device of a user;
determining, by the computer system, a challenge for the user based on previous user messages transmitted using a messaging service associated with the computer system, wherein the challenge comprises a string of words having a missing word in the string of words;
transmitting, by the computer system, the challenge to the device;
receiving a word response from the device for the missing word in the string of words;
determining, by the computer system, a list of acceptable responses based on word vectors generated from the string of words and a training set of word vectors determined from the previous user messages; and
processing, by the computer system, the access request based on a comparison of the word response to the list of acceptable responses.

12. The method of claim 11, wherein the access request is associated with access to one of a service provided by the service provider or data stored by the service provider, and wherein the processing the access request comprises one of allowing or denying access to the one of the service or the data.

13. The method of claim 11, wherein the determining the list of acceptable word responses for the missing word is based further on a corpus of documents.

14. The method of claim 11, wherein the list of the acceptable word responses comprises a probability ranking for entry of each of the acceptable word responses for the missing word, and wherein processing the access request is based on one of the probability rankings for the word response.

15. The method of claim 14, wherein the probability rankings for the entry of the acceptable word responses are further based on at least one of text data for services used by the service provider, location specific word responses for a location associated with the device, or a language used for presentation of the challenge.

16. A non-transitory machine-readable medium having stored thereon machine-readable instructions executable to cause a machine to perform operations comprising:
    determining an authentication query based on textual string data corresponding to previous user messages transmitted using a service provider messaging service, wherein the authentication query comprises a text string from the textual string data comprising a missing portion of the text string;
    determining a list of acceptable responses based on word vectors generated from the text string and a training set of word vectors determined from at least one of the previous user messages or a digital corpus of text;
    providing the authentication query in an interface associated with the service provider;
    receiving a text entry for the missing portion of the text string in response to the authentication query from a computing device; and
    authenticating the computing device based on the text entry and the list of acceptable responses.

17. The non-transitory machine-readable medium of claim 16, wherein the list is regionally specific to a location associated with the computing device.

18. The non-transitory machine-readable medium of claim 16, wherein prior to providing the authentication query in the interface, the operations further comprise:
    determining that a user using the computing device cannot be identified,
    wherein the authentication query is provided based on the determining that the user cannot be identified.

19. The non-transitory machine-readable medium of claim 16, wherein the authentication query comprises an image of the text string having the missing portion, and wherein the image includes at least one obfuscated portion.

20. The non-transitory machine-readable medium of claim 16, wherein the operations further comprise updating the list of acceptable responses based on a plurality of user responses to the authentication query.

\* \* \* \* \*